No. 125.

L. D. Gilman.
Wrench.
Patented July 15, 1863.

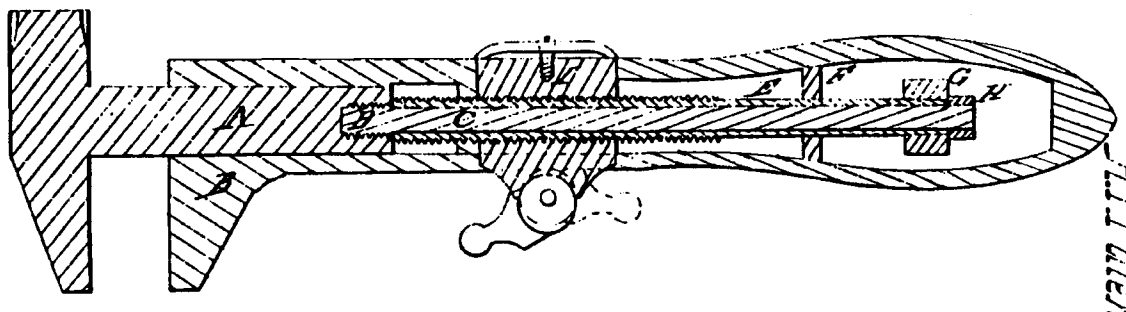

No. 125, to original Letters Patent No. 12,590.—*For Improvement in Screw-Wrenches.* (Plates, p. 347.)

What I claim is, adding the tube E, with the nut G, surrounding the rod *e* of the movable jaw, to the arrangement of the adjustable toothed plate with springs, the toothed shank, and the eccentric, with its strap attached to the toothed plate, as set forth.

LORENZO D. GILMAN.

DEPARTMENT OF COMMERCE
UNITED STATES PATENT AND TRADEMARK OFFICE

---

MISSING PAGE(S)

PATENT NUMBER AI 125 FOR THE ISSUE DATE 07/17/1855 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text